(12) United States Patent
Johnson

(10) Patent No.: X8933
(45) Date of Patent: Jun. 28, 1835

(54) GRIST MILL, &GRINDING PAINTS, SNUFF, &C.

(76) Inventor: William S. Johnson

William S. Johnson New York City
Letters Patent

The Schedule referred to in these Letters Patent and making part of the same containing a description in the words of the said William S Johnson himself of his improvement in mills for grinding Grain. Snuff Paints Dye stuffs &c called the eccentrick Mill or grinder To all to whom these Presents shall come.
Be it known that I William S Johnson of the City of New York in the County and State of New York have invented a new and useful improvement in Mills for grinding Grain. Snuff, paints dye Stuffs &c called the eccentricke Mill or grinder and that the following is a full and exact description of the construction and operation of the said Mill as improved by me. The bed stone or more properly the driver since it communicates motion to what is usually ~~called~~ denominated the runner in ordinary Mills is made in the usual way of the same materials of those in common use. being either of Stone or metal- and of such diameter as shall best suit the work to be performed and the power to be employed. The dress consists simply of a number of raised points resembling the surface of a rasp which I prefer for grinding Grain &c. but for grinding dye stuffs &c of a spiral groove or furrow commencing at the centre and running to the circumference of the Stone. The eccentricity of which spirals must be small so that the surface may be well covered in either case. a number of straight short furrows are cut radiating obliquely back from the centre of the Stone which furrows must be of a length not to pass out from under the runner hereafter mentioned and become shallower as they proceed from the centre. their object being solely to facilitate the feeding of the grain &c. to the grinding surfaces. The driver is made permanently fast upon the projecting end of a horizontal shaft which has a
double bearing and runs in appropriate Boxes so that the motion
of the driver may be steady and true the shaft receiving its
motion from the moving power by a strap or cog gearing as
may be preferred. it is also nicked or turned smaller at its
bearings so as to admit of a lateral movement by which the dis-
tance of the driver from the runner can be regulated and the
Mill be made to grind Coarse or fine. this movement may
be effected by a temper screw spring, weighted lever. or by
any of the means used for similar purposes. The top stone or
runner is made of the same materials as the driver - the dress
being similar except that it is reversed it has a circular open-
ing or eye at the centre which I have found in practice should
be about 2 inches in diameter for grain &c or about 4 for dye
stuffs &c when the diameter of the driver is 2½ feet. but this
must of course be varied to suit circumstances. From the
back of the runner which is hollowed out so as to bring the attach-
ment as near to the face of the stone as may be for strength. A short
hollow shaft rises. the bore of which forms a continuation of the eye
of the stone and which when metal is used may be cast solid
with the runner. through which bore the substance to be ground
is fed to the grinding surfaces. being enlarged at the outer extrem-
ity so as to admit the grain &c more freely or receive the foot of
the feed hopper hereafter mentioned. A neck or wrist is also turned
in the shaft (or which may also be formed by a screw ring) at the end
extending from the back of the runner near the end of which projects
with a square shoulder beyond the bearing of the shaft which [illegible]
in a cylindrical box of suitable materials that protrudes into the cav-
ity of the back of the runner so that the neck or wrist of the shaft
being slightly diminished towards its outer extremity) the bearing is -
chiefly upon the inner portion of the box close to the face of the run-
ner as possible. this arrangement is intended to admit of a slight
vibration to the runner when grinding that it may accommodate itself to the irregularities that may take place in the feeding between
the grinding surfaces. Moreover the bearing of the runner is raised
above that of the driver so as to bring the lower edge of the eye on
a level or a short distance above the centre of the driver making
thereby the eccentricity equal to the diameter of the eye and the dif-
ference of the diameters of the stones being made equal to the eccentri-
city the upper part of their circumferences when together coincide.
The feed hopper which is of a trumpet shape and receives the grain
&c from the shoe of an ordinary hopper into which it is first-
thrown is supported in an oblique position so as to afford an easy
descent to the grain &c by a short bracket or arm which rises
from the upright bearing of the runner shaft to which it is attached
its foot is diminished so as to enter the enlarged end of said shaft
and fit it neatly without friction. it is prolonged by a small square
bar or finger which is attached to the inner surface of the lower
end of said foot and winds spirally along the cavity of the shaft
until it nearly reaches the face of the runner. The office of this
finger being to assist the feeding and to prevent choking from
adhesion to the sides - particularly when grinding paint. The stones
are surrounded with with a curb of ordinary construction with
a proper discharging outlet two tubes being introduced opposite
the extremities of the horizontal diameter of the driver for the pur-
pose of keeping up a constant circulation of fresh air which
by the peculiar operation of the grinding surfaces is drawn in at
one side and discharged at the other.
Operation. — The substance to be ground being placed in the
hopper and the mill set in revolution by the combined motions of the
spiral finger and the driver and runner it is fed to the grinding
surfaces which reduce it rapidly to the degree of fineness for which
the mill is set. Although I have only described the mill as
operating with the grinding surfaces in a vertical position I
also intend to operate it horizontally by making a suitable al-
teration in the lower bearing or step of the driving shaft and dispensing with the feed hopper only retaining the spiral finger &
this position for grinding some Substances will be found to answer
best. Now I do not claim the principle of placing the driver and
runner eccentric to each other. but what I do claim as new &
as my invention for which I ask letters patent is the hollow
shaft of the runner attached and supported as herein described
and the spiral finger and feed hopper by the joint operation
of all which together with the grinding surfaces of the runner
and driver. the runner is properly sustained and the feeding
effected. I also claim the dress of the stones as set forth and
the plan of moving the bed stone to regulate the mill instead of
the upper stone or runner — In testimony that the foregoing
is a true sepecification of my said improvement I hereunto
unto set my Hand this 16th day of June 1835

Witnesses
Sam Stettinius
Wm. J. Steiger

Wm. L. Johnson

1308 [illegible]